(12) United States Patent
Eijkelenberg et al.

(10) Patent No.: US 7,556,063 B2
(45) Date of Patent: Jul. 7, 2009

(54) HIGH OVERPRESSURE VENT STRUCTURE HAVING SPRING STEEL RECLOSER PANEL

(75) Inventors: Tom Eijkelenberg, Westerlo (Zoerle-Parwijs) (BE); Guy Jakus, Zemst (BE); Guido Dom, Olen (BE)

(73) Assignee: Fike Corporation, Blue Springs, MO (US)

( * ) Notice: Subject to any disclaimer, the term of this patent is extended or adjusted under 35 U.S.C. 154(b) by 538 days.

(21) Appl. No.: 11/465,274

(22) Filed: Aug. 17, 2006

(65) Prior Publication Data

US 2008/0041473 A1    Feb. 21, 2008

(51) Int. Cl.
F16K 17/16    (2006.01)

(52) U.S. Cl. .................. 137/797; 137/68.18; 137/68.23; 137/68.27; 251/66; 220/89.2

(58) Field of Classification Search .................... 137/14, 137/68.18, 68.19, 68.23, 68.27, 797, 613; 251/66, 67; 138/89, 92; 220/89.2, 265; 169/56, 169/60, 61, 64; 52/98–100
See application file for complete search history.

(56) References Cited

U.S. PATENT DOCUMENTS

| | | | |
|---|---|---|---|
| 4,821,909 A | 4/1989 | Hibler et al. | |
| 6,070,365 A | 6/2000 | Leonard | |
| 7,234,278 B2 * | 6/2007 | Eijkelenberg et al. | 52/99 |
| 2004/0172889 A1 * | 9/2004 | Eijkelenberg et al. | 52/99 |
| 2008/0041454 A1 * | 2/2008 | Eijkelenberg et al. | 137/68.23 |

* cited by examiner

Primary Examiner—John Rivell
Assistant Examiner—Craig M Schneider
(74) Attorney, Agent, or Firm—Hovey Williams LLP

(57) ABSTRACT

Apparatus for protecting a confined space having a vent aperture for relief of an overpressure condition and provided with a vent unit having a pressure relief portion normally closing the vent aperture is provided with recloser structure for generally closing off the vent aperture in the event of opening of the pressure relief portion of the vent unit. The recloser structure includes a resilient, flexible, spring steel recloser panel that is normally held in a bent condition out of closing relationship to the vent aperture. Releasable mechanism engages the recloser panel for normally retaining the panel in its open position. An actuator is connected to the releasable mechanism for actuating the latter to release the recloser panel for movement as a function of its inherent resilience into substantially closing relationship to the vent aperture after the relief portion of the vent unit has opened. The vent apparatus including the spring steel recloser panel may be of either rectangular or circular configuration.

27 Claims, 2 Drawing Sheets

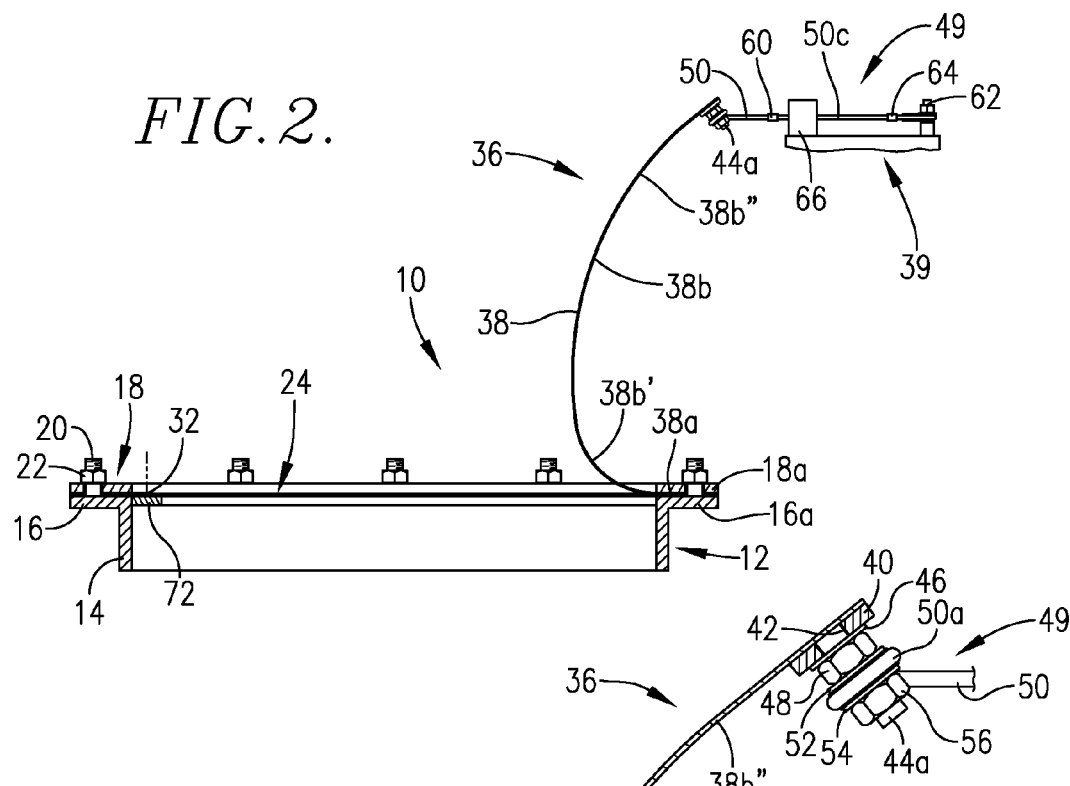
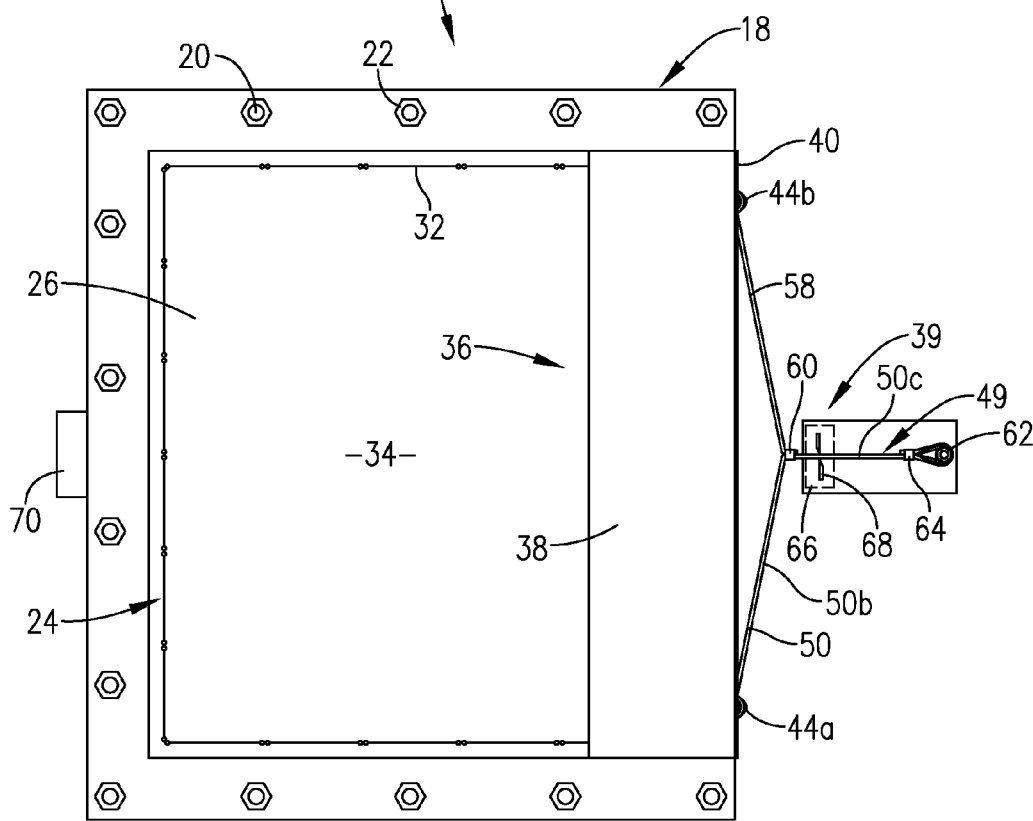

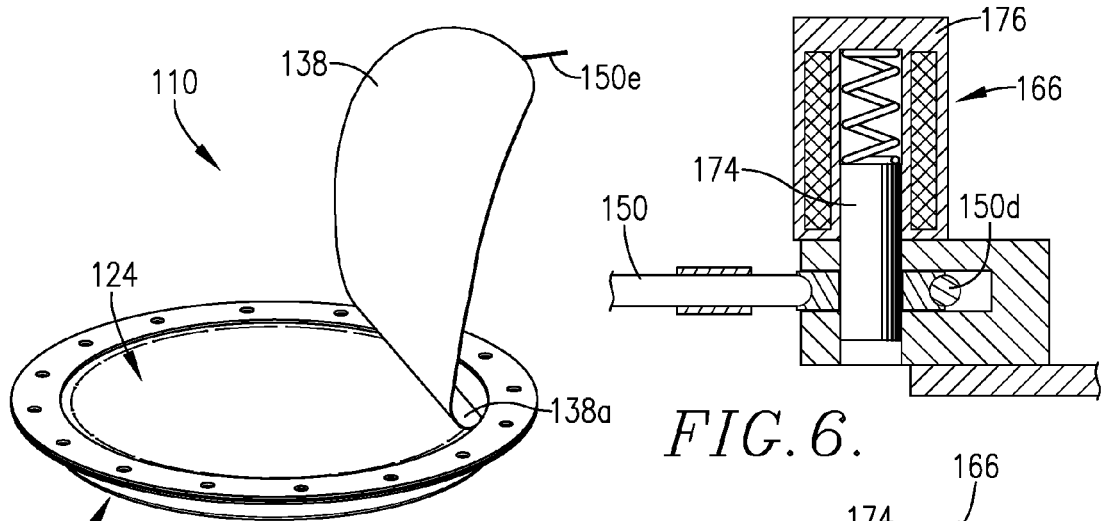
FIG. 8.
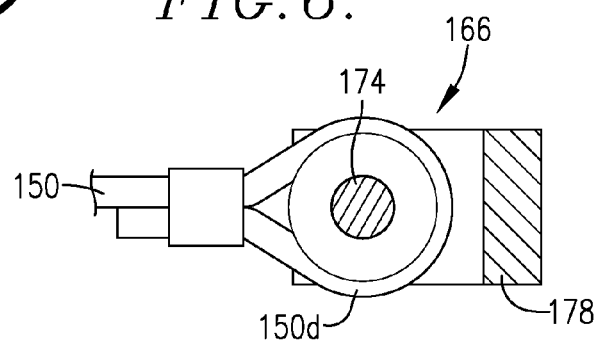
FIG. 6.
FIG. 7.
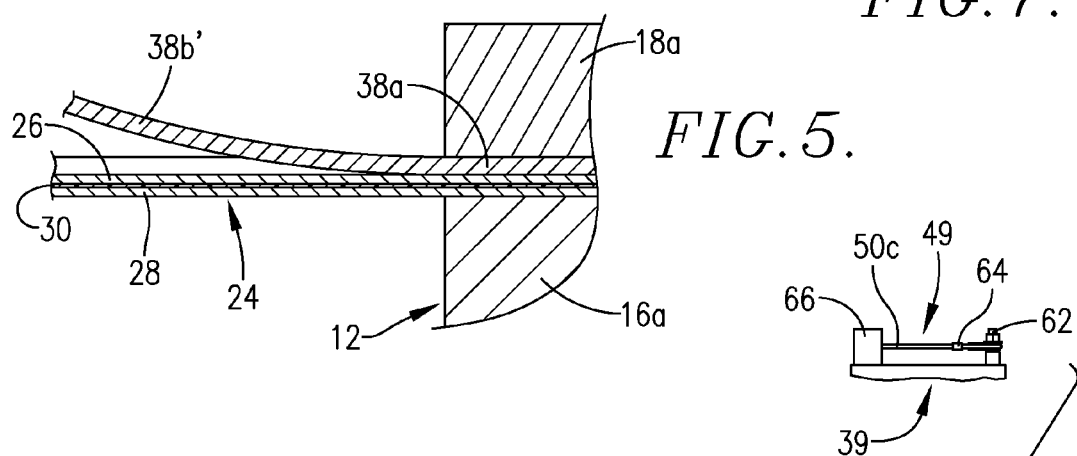
FIG. 5.
FIG. 3.
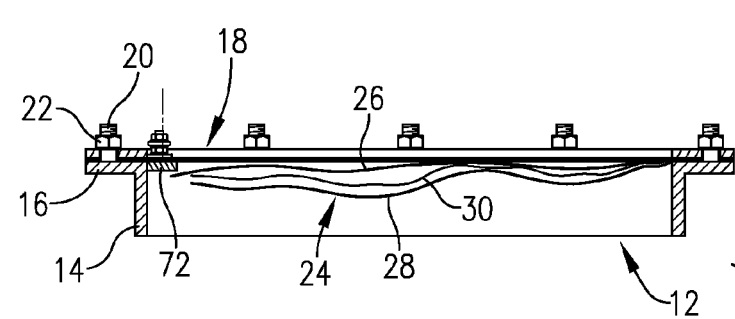

HIGH OVERPRESSURE VENT STRUCTURE HAVING SPRING STEEL RECLOSER PANEL

BACKGROUND OF THE INVENTION

1. Field of the Invention

The present invention relates to improvements in vent apparatus for protecting a confined space having a vent aperture for relief of an overpressure condition. Conventional vent apparatus is especially useful for covering relief openings in enclosures subject to rapid pressure build-ups such as may occur during explosions or uncontrolled combustion events in bag houses, duct work communicating with the bag houses, processing equipment, duct work leading to and from the processing equipment, buildings, pressure vessels, and other types of commercial and industrial installations where explosions or uncontrolled combustion events producing high overpressures may occur.

Vents of the type described have a vent unit including a vent portion that completely opens when a predetermined overpressure condition, such as an explosion or an uncontrolled fire, occurs in the protected area, thereby relieving the excessive overpressure and preventing untoward damage to equipment, vessels, duct work, building structures, and the like that would otherwise be subjected to potentially catastrophic overpressure events.

More particularly, the invention concerns high overpressure vent structure having a pressure relief portion that is in closing relationship to the vent aperture of the protected area, and that includes recloser structure for at least generally closing off the vent aperture in the event of opening of the pressure of the vent unit under a preselected overpressure condition. The recloser structure includes a spring steel vent aperture recloser panel that is normally maintained in a location out of closing relationship to the vent aperture, but may move into a position closing the vent aperture following opening of the pressure relief portion of the vent unit as a function of its inherent resilience of the spring steel.

Advantages of reclosing of the vent aperture by the recloser structure after opening of the primary vent unit include:
- elimination or reduction of the ingress of air and thereby oxygen, thus mitigating the effects of a secondary explosion if the protected area remained exposed to the surrounding atmosphere via the vent opening;
- prevention of continuation of combustion of process materials that could cause permanent damage to the protected installation;
- improvement of suppression of flames/fire, where inert gas, water mist, or the like, is used as an extinguishment agent, by virtue of the fact that the resulting combustion gases/flames cannot escape through venting holes; and
- reduction/elimination of contamination of the protected process zone.

Releasable mechanism is provided in engagement with the panel normally maintaining the panel in the bent condition thereof, out of the location closing the vent aperture. An actuator is connected to the releasable mechanism for effecting release of the panel upon from command from a sensor unit that senses opening of the vent unit from an overpressure condition.

2. Description of the Prior Art

Explosion vents traditionally have been provided with arupturable sheet of metal that has score lines or interrupted slits that define a line of weakness presenting the relief area of the vent. The amount of overpressure required to open the relief area of the vent is determined by, among other things, the type, thickness, and physical properties of the metal selected for fabrication of the explosion vent, the shape and nature of the line of weakness, the location of the line of weakness in the overall area of the vent, and oftentimes the provision of a series of spaced cross-tabs overlying the line of weakness in predetermined relative dispositions.

An exemplary explosion vent of this type is shown and described in U.S. Pat. No. 6,070,365, wherein a rectangular pressure relief panel is mounted in a frame adapted to be secured across a pressure relief opening. The unitary relief panel is formed from a single sheet of steel, stainless steel, Inconel, or other similar metal, and has a three-sided line of weakness defined by a plurality of interrupted slits. The series of spaced rupture tabs positioned over the line of weakness as shown in the '365 patent, must rupture before the relief area of the panel gives away under a predetermined high overpressure resulting from an explosion or a fast-burning fire.

U.S. Pat. No. 5,036,632 is another example of a conventional rectangular metal sheet explosion vent that has a three-sided line of weakness defined by interrupted slits. A layer of synthetic resin material or the like may be provided in covering relationship to the line of weakness slits. Rupturable tabs are also provided in the type of vent shown and described in the '632 patent that must break before the central section of the panel ruptures along the slit line to relieve an overpressure. An elastomeric sealing gasket or gaskets may be provided around the periphery of the rupturable metal sheet.

U.S. Pat. No. 4,498,261, referred to in the disclosure of the '632 patent, is a rectangular vent panel that opens under a relatively low pressure in which the thin sheet structure is described as being medium impact polystyrene, a relatively soft metal such as aluminum alloy, or a fully annealed stainless steel. Interrupted X-pattern slits extend through the vent panel and define individual lines of weakness that terminate at the apex of the X. A thin sealing membrane having the same area as the rupture panel is adhesively bonded to the rupture panel, and may be formed of polyethylene, stainless steel, or aluminum. Similar structure is shown and described in U.S. Pat. No. 4,612,739.

Although prior art pressure relief vents of the type described do satisfactorily open and relieve predetermined overpressure condition in protected spaces, these vents have remained open, thereby allowing the confined space to have continuing access to the surrounding atmosphere. Following out rush of products of combustion from the explosion or fire and relief of the high pressure, oxygen from the atmosphere is immediately available through the vent aperture that can produce a secondary explosion, exacerbation of a fire, or re-ignition of the fire.

SUMMARY OF THE INVENTION

It is conventional to provide apparatus for protecting a confined space having a vent aperture for relief of an overpressure condition. Apparatus of this type includes a vent unit having a pressure relief portion across the vent aperture in closing relationship thereto. The pressure relief portion of the vent unit opens when subjected to a preselected overpressure in the protected space.

This invention improves conventional vent apparatus for relieving high overpressure conditions by the provision of recloser structure for at least generally closing off the vent aperture in the event of opening of the pressure relief portion of the vent unit under a preselected overpressure condition. The reclosure structure includes a resilient flexible spring steel panel that in its normal state is of a configuration and in a position to at least substantially close the vent aperture. The spring steel panel is bent away from and disposed in a location out of a position substantially closing the vent aperture. Releasable mechanism engages the panel for normally maintaining the panel in the location thereof out of closing relationship to the vent aperture. An actuator is connected to the releasable mechanism for actuating the mechanism to release the panel for movement as a function of its inherent resilience from said location to said position thereof substantially closing the vent aperture after the relief portion of the vent unit has opened as a result of said preselected overpressure in the protected area.

A sensor is preferably provided in association with the vent unit of the vent apparatus that is operable to sense opening of the pressure relief portion of the vent unit resulting from an untoward high overpressure condition such as an explosion or products of combustion from a fast-burning fire. The sensor is operably connected to the actuator for effecting operation thereof to release the panel for return to a position closing the vent aperture when the sensor detects opening of the pressure relief portion of the vent unit. Operation of the actuator in response to a signal from the sensor may be controlled so that the spring steel panel normally held in a position away from the vent aperture is released for swinging movement into closing relationship to the vent aperture only after a predetermined variable time delay.

In a preferred embodiment, cable structure may be connected to the flexible spring steel panel for maintaining the latter out of closing relationship to the vent aperture of the protected structure, with actuating mechanism being provided in association with the cable structure for releasing the cable upon command, thereby allowing the flexible spring steel panel to swing back into a position substantially closing the vent aperture of the protected area.

BRIEF DESCRIPTION OF THE DRAWINGS

FIG. 1 is a plan view of vent apparatus having a vent unit provided with a pressure relief portion normally closing a vent aperture of protected structure, wherein the apparatus includes vent aperture recloser structure having a flexible spring steel panel bent away from the vent aperture and held in its normally open position by selectively releasable mechanism, that includes a cable-severing guillotine device forming a part of the releasable mechanism;

FIG. 2 is an essentially schematic side elevational view of the vent apparatus of FIG. 1, showing the flexible spring steel recloser panel in its restrained bent position;

FIG. 3 is a schematic side elevational view of the vent apparatus of FIGS. 1 and 2 showing the spring steel panel in its vent aperture closing position after opening of the vent unit under a predetermined overpressure;

FIG. 4 is a fragmentary enlarged view of one of the panel-restraining members that is connected to the selectively releasable mechanism;

FIG. 5 is an enlarged fragmentary view of a portion of the flexible spring steel panel illustrating the manner in which the panel is mounted on the vent unit of the vent apparatus;

FIG. 6 is an enlarged, essentially schematic, cross-sectional view of a portion of a retaining cable for the flexible spring steel panel, and a solenoid device for selective release of the cable, and thereby the panel, upon command;

FIG. 7 is a fragmentary, enlarged, horizontal cross-sectional view of the cable restraining and release mechanism as shown in FIG. 6, and FIG. 8 is a perspective view of an alternate vent apparatus having a circular configuration.

DETAILED DESCRIPTION OF THE PREFERRED EMBODIMENT

The vent apparatus 10 of this invention, illustrated in FIGS. 1 and 2, is adapted to be mounted in normal closing relationship to the vent aperture of structure presenting an area requiring protection from an untoward overpressure event.

A rectangular metal frame element 12 may, for example, be mounted on and secured to the protected area structure in surrounding relationship to a vent aperture of the structure. Frame element 12 may typically have a box-defining leg segments 14 that are secured to the protected area structure in surrounding aligned relationship to the vent aperture of the structure, while the flange segments 16 of frame element 12 are unitary with and project outwardly from the extremities of leg segments 14 remote from the protected area structure. It is to be understood in this respect that the frame element 12 is exemplary only, and a number different components may be provided for securing vent apparatus 10 on structure to be protected in alignment with a respective vent aperture therefor.

A rectangular vent unit hold-down member 18 may be provided in overlying relationship to the flange segments 16 of frame element 12. A series of threaded studs 20 secured to the outer face of flange segments 16 and that extend through respective openings therefor in flange segments 16, are provided, with associated hold-down nuts 22.

A conventional, composite, laminated vent unit 24 is trapped between flange segments 16 and hold-down member 18 and has outer dimensions approximately equal to the peripheral dimensions of flange segments 16 and hold-down member 18. Vent unit 24, as shown in FIG. 5, may, for example, include a pair of vent panels 26 and 28 of stainless steel, Inconel, titanium, nickel, or Hastelloy, or similar metals, separated by an intermediate cover sheet 30 of, for example, fluorinated ethylene propylene (FEP), or alternatively, polytetrafluoroethylene (PTFE), or perfluoroalkoxy polymer (PFA). Suitable stainless steel stock may include types 301, 304, 316, 316L, and 316LT. The vent panels 26 and 28 typically have a series of spaced, end-to-end slits defining a substantially U-shaped line of weakness 32 presenting a pressure relief portion 34 of each vent panel 26 and 28. The terminal ends of each line of weakness 32 remote from the bight portion thereof, present respective hinge areas for the pressure relief portions 34. The sheet 30 serves to cover and close the slits defining the lines of weakness 32 in vent panels 26 and 28.

In preferred embodiments of vent apparatus 10, as is well known to those skilled in the explosion vent panel art, vent panels 26 and 28 may be fabricated from metal stock of varying type, thickness, and physical properties, and the spacing between the slits making up lines of weakness 32 adjusted to assure opening of the pressure relief portion 34 of vent panels 26 and 28 by severing of the space between adjacent slits when the pressure buildup within the protected area reaches a predetermined overpressure value. Exemplary vent panels 26 and 28 may be fabricated of a selected metal, with a preferred material being 1.4301 stainless steel having a thickness of from about 0.2 mm to about 0.6 mm and preferably about 0.4 mm. The sheet 30 may, for example, be of a thickness of about 0.250 mm and preferably is from about 0.0125 mm to about 0.30 mm.

Vent aperture recloser structure 36 preferably comprises a recloser panel 38 fabricated from hard rolled type 1.4310 stainless spring steel having a thickness of from about 0.6 mm to about 1.2 mm and most preferably about 0.8 mm. The difference between the yield point and the tensile strength of the recloser panel is no more than about 30%. Preferably, the yield point and tensile strength of the recloser panel are at least about 1200 N/mm² and about 1450 N/mm², respectively. Exemplary spring steel materials useful in fabrication of vent unit 62 of vent apparatus 30 are available from Precision Metals M.V. B-2800 Mechelen, BE, including stainless steel austenitic 1.4310 C1300-hard rolled EN10088-2 having a tensile strength of 1404-1463 N/mm, a hardness of 431-446 HV, and an elongation (A80 mm %) 11.5-16.5; EN10151 AMS 5519 having a tensile strength of 1440-1460 N/mm², a hardness of 465-468 HV, and an elongation (A80 mm %) 13-16; and EN 10151 types having (a) a tensile strength of 1325 N/mm², a hardness of 403 HV, and an elongation (A80 mm %) A50:9; (b) a tensile strength of 1412-1428 N/mm², a hardness of 429-431 HV, and an elongation (A80 mm %) 1.2; ©) a tensile strength of 1397 N/mm², a hardness of 423 HV, and an elongation (A80 mm %) A50:4; (d) a tensile strength of 1410-1414 N/mm², a hardness of 400-402 HV, and an elongation (A80 mm %) 1.4; and (e) a tensile strength of 1380-1382 N/mm², a hardness of 441 HV, and an elongation (A80 mm %) 16-18.

An end marginal section 38a of recloser panel 38 is trapped between components comprising flange segment 16a of frame element 12 and leg portion 18a of hold-down member 18. The studs 20 secured to flange segment 16a and nuts 22 thereon, serve to firmly affix marginal section 38a of recloser panel 38 to frame element 12 and hold-down member 18. It is to be observed from FIG. 2 that the remaining section 38b of recloser panel 38 is bent in a direction away from vent unit 24 and is of continuously curved configuration. The segment 38b' of curved section 38b adjacent marginal section 38a of recloser panel is of greater curvature than the remaining segment 38b" of section 38b.

Releasable mechanism 39 is provided in engagement with the recloser panel 38 for normally maintaining the latter in its bent configuration as shown in FIG. 2 out of closing relationship to the vent aperture. Mechanism 39 includes an elongated bar 40 is affixed to the outer face of segment 38b" of section 38b of recloser panel 38, opposite vent unit 34, and preferably extends substantially the full width of recloser panel 38. Bar 40 is provided with two widely-spaced openings 42 adjacent opposite ends thereof that receive respective members in the form of externally threaded studs 44a and 44b that are welded to the rear face of section 38b of recloser panel 38. Each of the studs 44a and 44b extends beyond the outer face of bar 40. A washer 46 is provided on each stud 44a and 44b adjacent bar 40. A nut 48 is threaded onto each stud 44a and 44b adjacent washer 46. Retainer structure 49 includes an elongated cable 50, forming a part of the releasable mechanism 39. One end of cable 50 is turned upon itself to form a loop 50a that is trapped between washers 52 and 54 on stud 44a. An outer nut 56 engages the washer 54 on stud 44a and snugs washers 52 and 54 against end loop 50a of cable 50. Similarly, a cable section 58 of retainer structure 49 has a loop turned upon itself that is trapped between nuts and washers on stud 44b in a manner similar to the entrapment of cable loop 50a on stud 44a. The end of cable section 58 remote from stud 44b is connected to an intermediate portion of cable 50 by cable clamp 60.

It can be seen from FIG. 1, for example, that the stretch 50b of cable 50 and cable section 58, joined by cable clamp 60, in association with bar 40, form a generally triangular relationship of the components such that the restraining force on the outermost end of recloser panel 38 is substantially equalized thereby precluding canting of the recloser panel 38.

The outermost free end of section 50c of cable 50 is re-bent upon itself and looped about a capstan 62. Cable clamp 64 secures adjacent portions of cable section 50c. A device 66 is provided for severing section 50c of cable 50 upon command. Device 66 may include a guillotine unit 68 having opposed blades that cooperate to sever cable section 50c at a point between clamp 60 and clamp 64.

A sensor 70 of conventional construction is preferably provided in association with frame element 12. Sensor 70 is operable to sense opening of the pressure relief portions 34 of vent panels 26 and 28 under a predetermined overpressure. Sensor 70 may be of the optical, magnetic, or severed wire type. An electrical signal is generated by sensor 70 upon opening of the pressure relief portions 34 of vent panels 26 and 28 that controls operation of device 66 to effect cutting of cable section 50c. When the cable section 50c is severed, the inherent resiliency of recloser panel 38 causes the panel to move into the position shown in FIG. 3, where the outermost extremity of recloser panel 38 engages an inwardly-directed plate member 72 secured to the innermost surface of leg segment 14 opposite marginal section 38a of recloser panel 38, thereby substantially closing the vent aperture. The vent panels 26 and 28 along with cover 30 are returned to their positions within frame element 12, although normally in substantially deformed position, as schematically shown in FIG. 3, as a result of the violent forces imposed on the vent unit 24 during relief of an overpressure condition in the protected area.

Vent apparatus 10 may be programmed such that the device 66 is not activated to sever cable 50 and thereby effect closing of the vent aperture by recloser panel 36 for a predetermined time interval following sensing of opening of pressure relief portions 34 by a predetermined overpressure condition. For example, in some installations of vent apparatus 10, release of the recloser structure 36 and pivoting thereof into closing relationship to the vent aperture of the protected structure, may not occur for as long as five seconds, or an even longer time period if desired by a particular customer.

In the alternate embodiment of the invention illustrated in FIGS. 6 and 7 an electro-mechanical device 166 is used as a replacement for device 66. In this instance., the outer segment of section 150d of cable 150 is looped around a spring-biased, normally open armature 174 of solenoid 176. When armature 174 is retracted against the force of spring 178 upon receiving an electrical command signal from sensor 70, the loop 150d of cable section 150c is released from the armature 174, thereby allowing recloser panel 38 to close as previously described.

The alternate vent apparatus 110 of the invention shown in FIG. 8 differs from vent apparatus 10 only in that the frame element 112, vent unit 124, and recloser panel 138 are all of circular configuration rather than being rectangular, as in the other embodiments of the invention. Operation of vent apparatus 110 is essentially the same as the invention of FIGS. 1-7 in that cable section 150, connected to recloser panel 138, is severed by guillotine mechanism or released by a solenoid, similar to solenoid 166, upon command from a sensor such as sensor 70. However, in view of the somewhat narrower marginal section 138a of recloser panel 138 of apparatus 110, somewhat thicker spring steel material may be necessary to assure full closure of recloser panel 138 upon release thereof from its normally restrained position, as shown in FIG. 7.

We claim:

1. An apparatus for protecting a confined space having a vent aperture for relief of an overpressure condition and provided with a vent unit having a pressure relief portion across the vent aperture in closing relationship thereto and that opens when subjected to a preselected overpressure in the protected space, said apparatus including:

recloser structure for at least generally closing off the vent aperture in the event of opening of the pressure relief portion of the vent unit under said preselected overpressure, said structure including a resilient flexible recloser panel that in its normal state is of a configuration and in a position to at least substantially close the vent aperture, said recloser panel being bent away from and disposed in a location out of the position thereof substantially closing the vent aperture;

releasable mechanism engaging the recloser panel for normally maintaining the recloser panel in said location thereof out of closing relationship to the vent aperture; and an actuator connected to the releasable mechanism for actuating the mechanism to release the recloser panel for movement as a function of it inherent resilience from said location to said position thereof substantially closing the vent aperture after the relief portion of the vent unit has opened as a result of said preselected overpressure in the protected area.

2. The apparatus of claim 1, wherein said confined space is provided with components defining the vent aperture, said recloser panel being provided with a marginal section that is adapted to be secured to a component adjacent the vent aperture.

3. The apparatus of claim 1, wherein said recloser panel is of spring steel material.

4. The apparatus of claim 3, wherein said recloser panel is stainless spring steel.

5. The apparatus of claim 3, wherein the difference between the yield point and the tensile strength of the recloser panel is no more than about 30%.

6. The apparatus of claim 3, wherein the yield point and tensile strength of the recloser panel are at least about 1200 N/mm² and about 1450 N/mm², respectively.

7. The apparatus of claim 3, wherein said recloser panel is 1.4310 stainless spring steel.

8. The apparatus of claim 3, wherein said recloser panel is about 0.8 mm thick.

9. The apparatus of claim 1, wherein is provided components defining said vent aperture, said recloser panel having an innermost section adapted to be secured to a component adjacent the vent aperture.

10. The apparatus of claim 9, wherein the innermost section of the recloser panel is essentially flat, said recloser panel including a continuously curved section that extends away from the innermost section to the releasable mechanism.

11. The apparatus of claim 10, wherein the continuously curved section of the recloser panel includes a segment adjacent the flat innermost section of greater curvature than the remaining segment of the recloser panel remote from the innermost segment.

12. The apparatus of claim 1, wherein said releasable mechanism includes at least one member secured to the recloser panel on the side thereof opposite the vent aperture, and retainer structure connected to and extending away from the member.

13. The apparatus of claim 12, wherein said actuator includes a device operable to disconnect the retainer structure from the member upon command to release the recloser panel for return to its position substantially closing the vent aperture.

14. The apparatus of claim 13, wherein said device includes a guillotine blade device operable upon said command for severing the cable.

15. The apparatus of claim 13, wherein the retainer structure includes a cable and said device is a electromechanical unit operable upon said command to release the cable.

16. The apparatus of claim 14, wherein said unit is a solenoid.

17. The apparatus of claim 1, wherein is provided a sensor operable to sense opening of the pressure relief portion of the vent unit under a preselected overpressure, said sensor being connected to said actuator for detecting actuation of the releasable mechanism thereby allowing closing of the flexible recloser panel.

18. The apparatus of claim 17, wherein said sensor is operable to delay operation of the actuator for a preselected time interval.

19. The apparatus of claim 18, wherein the delay interval of the sensor is selectively variable.

20. An apparatus for protecting a confined space having a vent aperture for relief of an overpressure condition said apparatus comprising:

a vent unit adapted to be mounted across the vent aperture and having a pressure relief portion in normal closing relationship to the vent aperture, said pressure relief portion being operable to open when subjected to a predetermined overpressure in the protected space;

recloser structure mounted on the vent unit for at least generally closing off the vent aperture in the event of opening of the pressure relief portion of the vent unit under said preselected overpressure, said structure including a resilient flexible recloser panel that in its normal state is of a configuration and in a position to at least substantially close the vent aperture, said recloser panel being bent away from and disposed in a location out of the position thereof substantially closing the vent aperture;

releasable mechanism engaging the recloser panel for normally maintaining the recloser panel in said location thereof out of closing relationship to the vent aperture; and an actuator connected to the releasable mechanism for actuating the mechanism to release the recloser panel for movement as a function of its resilience from said location to said position thereof, as the pressure relief portion of the vent unit is returned to the vent aperture in conjunction with movement of the recloser panel into said disposition substantially closing the vent aperture after the relief portion of the vent unit has opened as a result of said preselected overpressure in the protected area.

21. The apparatus of claim 20, wherein said confined space is provided with components defining the vent aperture, said recloser panel being provided with a marginal portion that is secured to the vent unit adjacent the vent aperture.

22. The apparatus of claim 20, wherein said recloser panel is of spring steel material.

23. The apparatus of claim 22, wherein said recloser panel is 1.4310 stainless steel.

24. The apparatus of claim 22, wherein said recloser panel is about 0.8 mm thick.

25. The apparatus of claim 22, wherein said recloser panel is stainless spring steel.

26. The apparatus of claim 25, wherein the difference between the yield point and the tensile strength of the recloser panel is no more than about 30%.

27. The apparatus of claim 26, wherein the yield point and tensile strength of the recloser panel are at least about 1200 N/mm² and about 1450 N/mm², respectively.

* * * * *